(12) United States Patent
Chien

(10) Patent No.: US 7,147,368 B2
(45) Date of Patent: Dec. 12, 2006

(54) MEASURING DEVICE FOR HEAT PIPE

(75) Inventor: Yang-Chang Chien, Tu-Cheng (TW)

(73) Assignee: Hon Hai Precision Industry Co., Ltd. (TW)

( * ) Notice: Subject to any disclaimer, the term of this patent is extended or adjusted under 35 U.S.C. 154(b) by 77 days.

(21) Appl. No.: 11/013,496

(22) Filed: Dec. 15, 2004

(65) Prior Publication Data

US 2005/0220168 A1   Oct. 6, 2005

(30) Foreign Application Priority Data

Apr. 2, 2004   (CN) .................. 2004 2 0044466

(51) Int. Cl.
*G01K 1/08*   (2006.01)

(52) U.S. Cl. .................. 374/147; 374/112; 374/208

(58) Field of Classification Search ............... 374/147, 374/112
See application file for complete search history.

(56) References Cited

U.S. PATENT DOCUMENTS 3,682,239 A  *  8/1972  Abu-Romia ............ 165/104.26

FOREIGN PATENT DOCUMENTS

JP        63315889 A  *  12/1988

OTHER PUBLICATIONS

Shih, Yu-Cheng, "Hydraulic and Thermal Characters of Mesh Structures in Heat Pipes," Dissertation and Thesis Abstract System, Aug. 2002, pp. 35-47, Record ID :90CGU00489018, TW.

* cited by examiner

*Primary Examiner*—Gail Verbitsky
*Assistant Examiner*—Mirellys Jagan
(74) *Attorney, Agent, or Firm*—Morris Manning & Martin; Tim Tingkang Xia, Esq.

(57) ABSTRACT

In this study, plate type heat pipes having mesh capillaries were investigated experimentally and theoretically. A test apparatus was designed to test thermal performance of a plate type copper-water heat pipe having one or two layers of #50 or #80 mesh capillary structures with 5 to 50 W heat input. A working fluid charge volume fraction varied from 13% to 50% of the heat pipe internal space. In addition to horizontal orientation, the heat pipes were tested with the evaporator section elevated up to a 40 degree inclination angle. Temperature distribution of the heat pipe was measured, and the evaporator, adiabatic and condensation resistance of the heat pipe were calculated separately. The effects of mesh size, charge volume, and inclination angle on each thermal resistance were discussed. In general, the #80 mesh yields lower thermal resistances; and inclination angle has more significant effect on the condenser section than the evaporator section. Theoretical models were proposed to interpolate the evaporation and condensation phenomena shown by the experiments. The present model predicts the experimental data of evaporation resistance to within ±20%, and most condensation resistance data to within ±30%.

14 Claims, 3 Drawing Sheets

MEASURING DEVICE FOR HEAT PIPE

TECHNICAL FIELD

The present invention relates to a measuring device for a heat pipe, and particularly to a measuring device which can accurately measure heat transfer characteristics of the heat pipe.

BACKGROUND

Heat pipes have been suggested for cooling electronic components. Conventionally, a heat pipe comprises an evaporator to take in heat and a condenser to expel heat. Working fluid is contained in the heat pipe to transfer heat from the evaporator to the condenser. The heat entering the evaporator of the heat pipe boils the fluid and turns it into a vapor. The vapor expands in volume and travels to the condenser where it condenses to a liquid and gives up its heat. The liquid is then returned to the evaporator by gravity or a wick and starts the process again.

However, a heat pipe has its limits such as capillary pumping limit, nucleate boiling limit and entrainment limit. Measuring devices can measure heat transfer characteristics of the heat pipe which determine these limits. FIG. 4 shows a conventional measuring device 1 for measuring heat transfer characteristics of a heat pipe. The device 1 comprises a base 2 and a clamp 3. The clamp 3 defines a first hole 4 to receive the hot end or the cold end of the heat pipe, and a groove 6 communicating with the first hole 4. The groove 6 allows the heat pipe to be inserted into the first hole 4 freely. The base 2 defines a second hole 5 to receive a heating member which heats the hot end of the heat pipe, or to receive a cooling member which cools the cold end of the heat pipe. However, there is a clearance between the heat pipe and the inner surface of the clamp 3 due to machining error and so on. Air in the clearance unduly increases the thermal resistance. This may result in an error between measure values from the practical heat transfer characteristics of the heat pipe.

Thus, an improved measuring device for a heat pipe which can accurately measure heat transfer characteristics of the heat pipe is desired.

SUMMARY OF THE INVENTION

Accordingly, an object of the present invention is to provide a measuring device for a heat pipe, wherein there is very low heat conductive resistance between the measuring device and the heat pipe so that the measuring device can accurately measure heat transfer characteristics of the heat pipe.

To achieve the above-mentioned object, a measuring device for a heat pipe in accordance with a preferred embodiment of the present invention, comprises a first platform, a second platform, a heating member, a cooling member and thermal probes. The heat pipe comprises a first end and a second end opposite to the first end. The first platform flexibly receives the first end of the heat pipe therein and the second platform flexibly receives the second end of the heat pipe therein. The heating member is for heating the first end of the heat pipe and the cooling member is for cooling the second end of the heat pipe. The thermal probes are received into the first platform and the second platform to measure the temperatures where they are positioned.

Other objects, advantages and novel features of the present invention will be drawn from the following detailed description of the preferred embodiment of the present invention with attached drawings, in which:

DETAILED DESCRIPTION OF A PREFERRED EMBODIMENT

Figure 1:
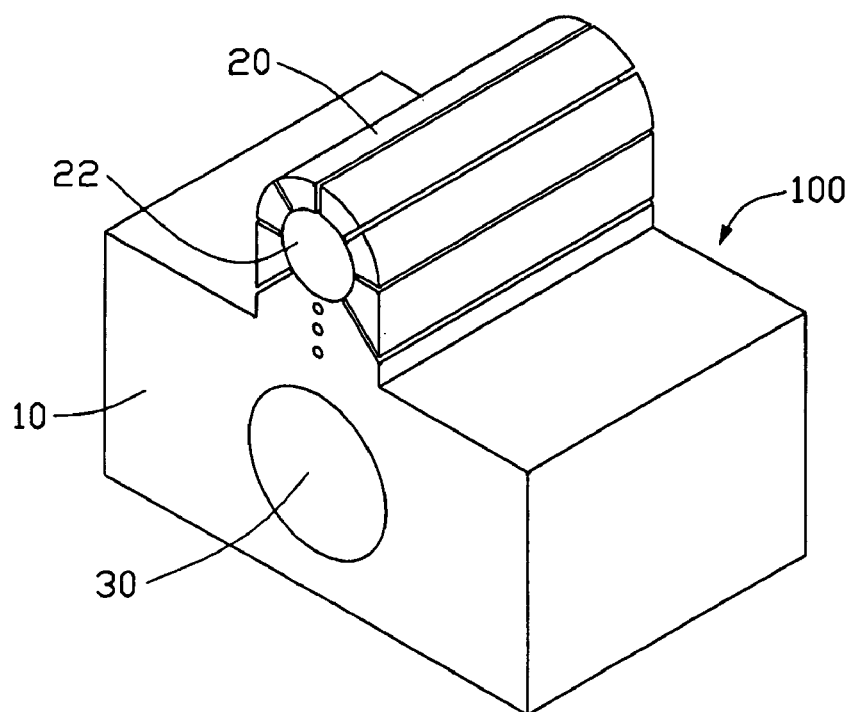
FIG. 1 is an isometric view of a platform of a measuring device in accordance with a preferred embodiment of the present invention.
Figure 2:
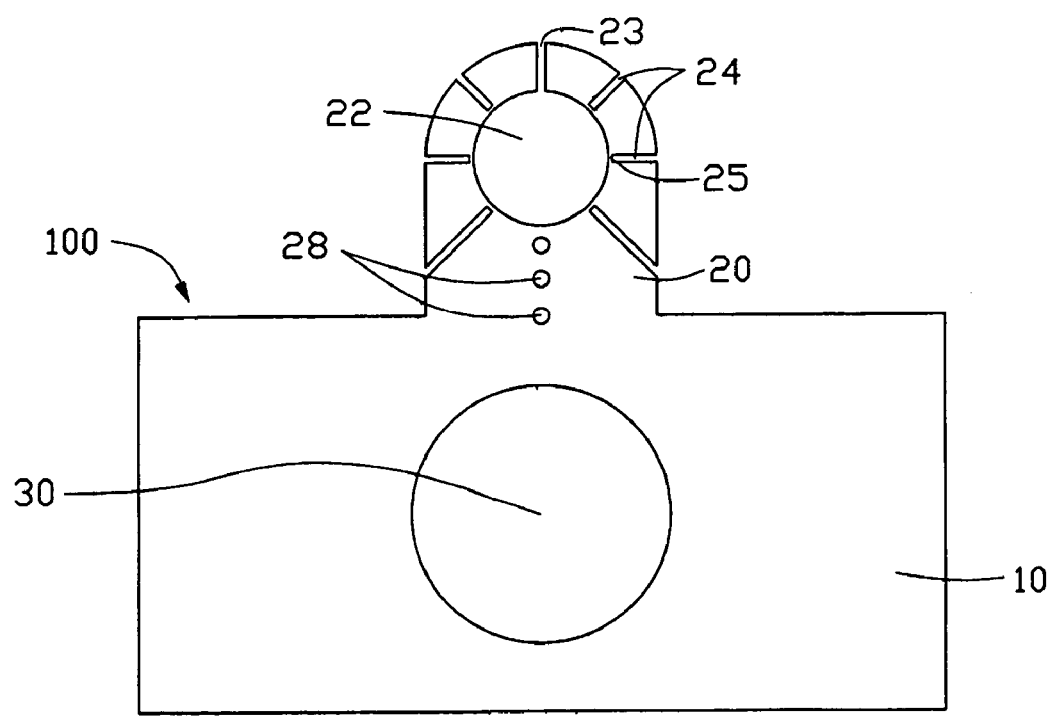
FIG. 2 is a front view of the platform of FIG. 1.

FIGS. 1–2 show a platform 100 of a measuring device for a heat pipe in accordance with a preferred embodiment of the present invention. The platform 100 comprises a base 10 and a clip-like mechanism 20 integrally extending from the base 10.

The base 10 defines a hole 30 therein. The hole 30 is for receiving a heating member 200 (see FIG. 3) such as a heating tube, or a cooling member 210 (see FIG. 3) such as a cold water pipe as a temperature adjusting member.

Figure 3:
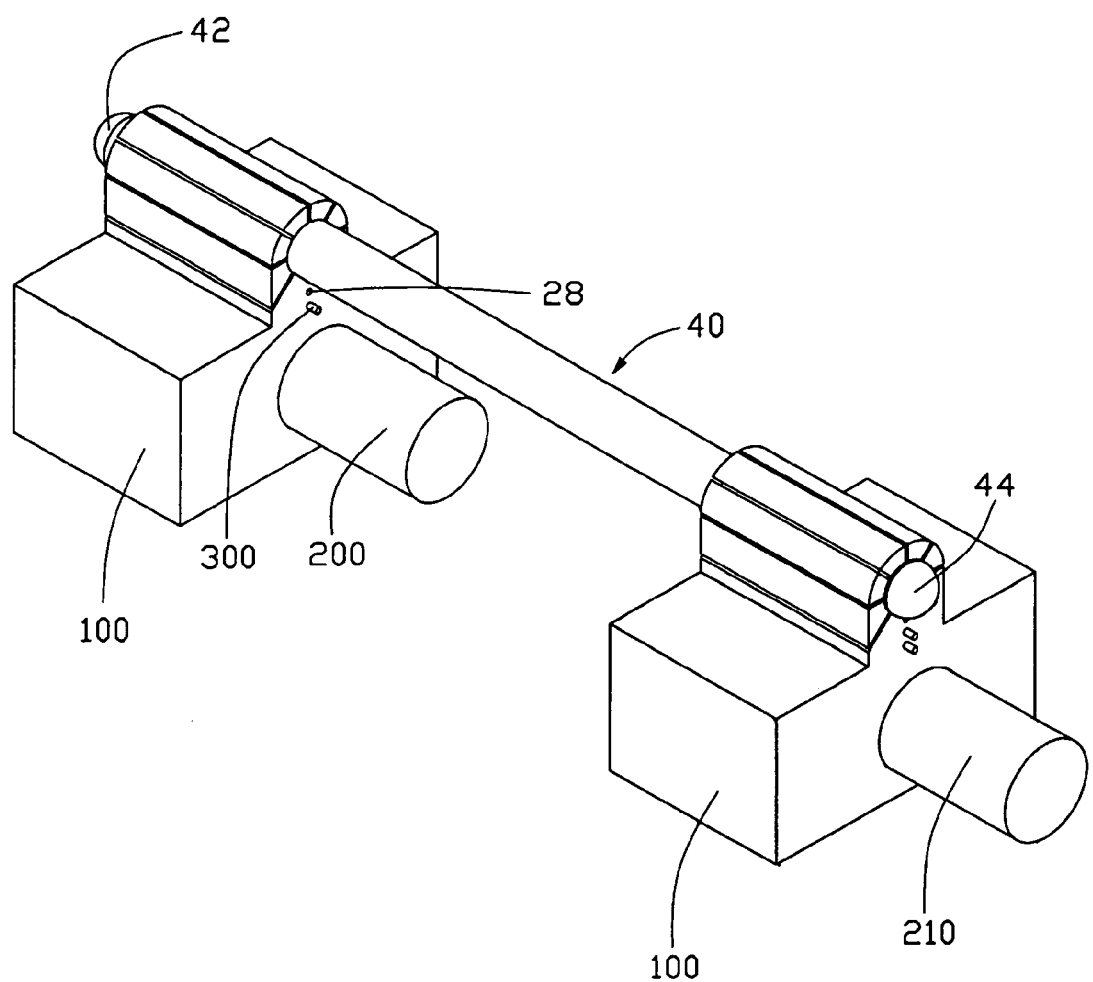
FIG. 3 shows the measuring device, having a heat pipe mounted thereto.
Figure 4:
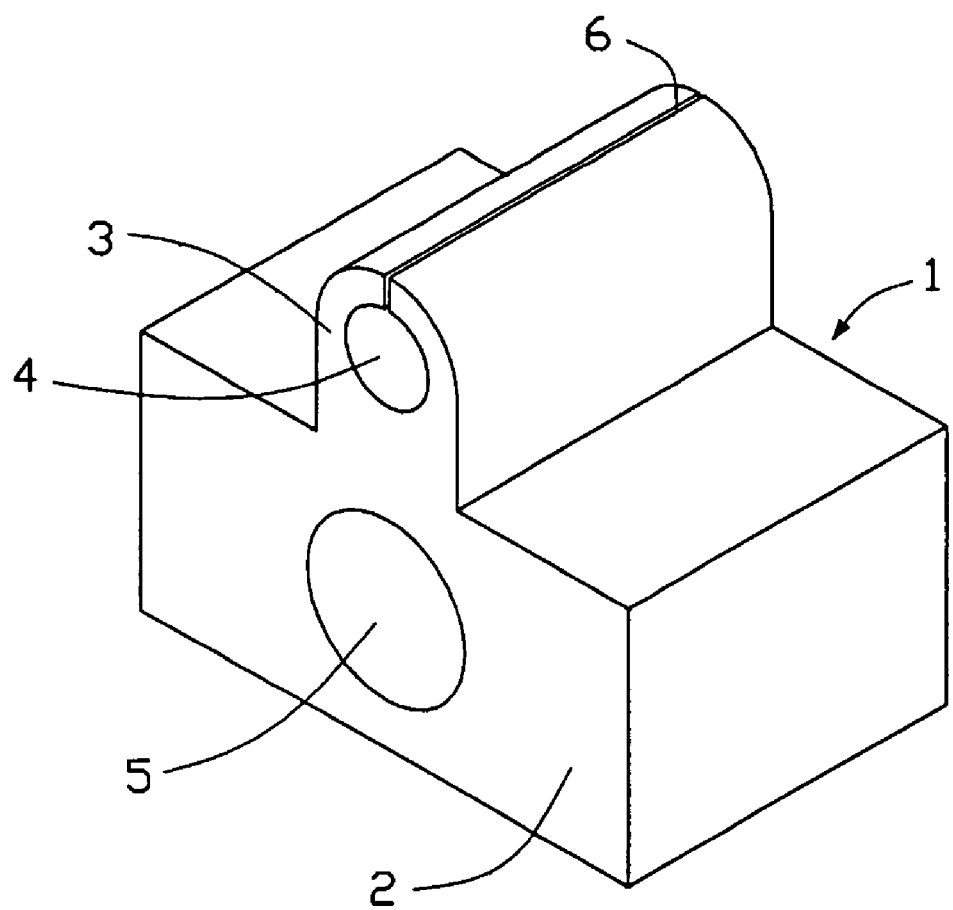
FIG. 4 is an isometric view of a conventional measuring device.

The clip 20 defines a substantially central aperture 22 for receiving one part of a pipe-like member like a heat pipe 40 (see FIG. 3). A split 23 is defined in the clip 20 from its outer surface, in communicating with the aperture 22. Thus the clip 20 is a little elastic. A plurality of longitudinal grooves 24 are radially defined in the clip 20. The clip 20 further defines a plurality of thin partitions 25 interposed between the aperture 22 and the grooves 24. The thin partitions 25 may be manufactured by precision wire electrical discharge machining or other methods.

As known, the rigidity or the flexibility of a metal board is generally determined by factors such as the modulus of elasticity, and the length, the height, and the width of a cross section of the metal board. If the material and the length of a metal board are selected to remain constant, the smaller the height and the width of the cross section of the metal board are, the greater the flexibility of the metal board is. Therefore, the grooves 24 and the thin partitions 25 make the clip 20 flexible. The clearance between the heat pipe 40 and the clip 20 is greatly reduced after the heat pipe 40 is received in the aperture 22 of the clip 20. Thus, the impact of any machining error of the clip 20 is significantly reduced. The corresponding end of the heat pipe 40 is intimately wrapped by the clip 20. This enables accurate measuring of heat transfer characteristics of the heat pipe 40 with the present measuring device.

The platform 100 further defines a plurality of orifices 28 between the hole 30 and the aperture 22. The orifices 28 are linearly arranged at uniform intervals to receive a plurality of thermal probes 300, such as thermistors, thermometers, thermocouples, so on. The thermal probes 300 measure temperatures at the orifices 28 of the platform 100 where the thermal probes 300 are positioned.

Referring to FIG 3, the measuring device comprises two separate platforms 100. The heat pipe 40 has a hot end or an evaporation section 42 and a cold end or a condensation section 44. The hot end or the evaporation section 42 is inserted into the aperture 22 of one platform 100. The heating member 200 is inserted into the corresponding hole 30 to heat the hot end or the evaporation section 42. Similarly, the cold end or the condensation section 44 is inserted into the aperture 22 of another platform 100. The cooling member 210 is inserted into the corresponding hole 30 of said another platform 100 to cool the cold end or the condensation section 44. Thus, the actual working conditions of the heat pipe 40 are simulated. When the temperatures of the hot end or the evaporation section 42 and the cold end or the condensation section 44 are stabilized, a series of temperature values associated with the two ends 42, 44 are gained by means of the thermal probes 300 inserted in the orifices 28. Using these values, the temperature difference between the hot end or the evaporation section 42 and the cold end or the condensation section 44 can be calculated. Moreover, other heat transfer characteristics which determine the performance of the heat pipe 40, such as the maximum quantity of heat transfer and heat transfer resistance can be also calculated.

It is understood that the invention may be embodied in other forms without departing from the spirit thereof. Thus, the present example and embodiment are to be considered in all respects as illustrative and not restrictive, and the invention is not limited to details given herein.

What is claimed is:

1. A combination comprising:
   a heat pipe; and
   two identical platforms, each of the platforms comprising;
   a base; and
   a clip integrally extending from the base, the clip defining a substantially central aperture for receiving part of the heat pipe, and a plurality of grooves radially around the aperture and separated from the aperture by thin partitions of the clip.

2. The combination of claim 1, wherein the base defines a hole therein, and a heating member for heating the heat pipe or a cooling member for cooling the heat pipe is set in the hole.

3. The combination of claim 2, wherein a plurality of temperature measuring points spaced apart from each other at uniform intervals is defined in each of the platforms between the aperture and the hole.

4. The combination of claim 3, wherein thermal probes are positioned at the temperature measuring points for measuring temperatures thereat.

5. The combination of claim 4, wherein the temperature measuring points are orifices defined in each of the platforms.

6. A mechanism for having thermal contact with a pipe-like member, comprising:
   a clip defining an aperture therein to partially receive said pipe-like member;
   a split formed on said clip and communicating said aperture with an outside of said clip so as to enable said aperture to be radially size-variable; and
   at least one groove extending from an outer surface of said clip toward said aperture without any communication with said aperture so as to enhance flexibility of said clip.

7. The mechanism of claim 6, wherein said clip is formed on a platform having a temperature adjusting member therein.

8. The mechanism of claim 6, wherein said clip defines a plurality of temperature measuring points spaced apart from each other at uniform intervals and being next to said aperture.

9. The heat pipe combination of claim 8, wherein thermal probes are positioned at said temperature measuring points for measuring temperatures thereat.

10. The heat pipe combination of claim 9, wherein said temperature measuring points comprise orifices defined in said clip.

11. A measuring device, comprising:
    a first platform comprising an aperture for flexibly receiving a first end of a heat pipe therein, the first platform further comprising plurality of grooves radially defined therein around the aperture, wherein the grooves are separated from the aperture by thin partitions of the first platform;
    a second platform comprising an aperture for flexibly receiving a second end of the heat pipe therein, the second platform further comprising a plurality of grooves radially defined therein around the aperture, wherein the grooves are separated from the aperture by thin partitions of the second platform;
    a heating member for heating the first end of the heat pipe;
    a cooling member for cooling the second end of the heat pipe; and
    thermal probes received into the first platform and the second platform for measuring temperatures where they are positioned.

12. The measuring device of claim 1, wherein a hole is defined in each of the platforms, for receiving the heating member or the cooling member.

13. The measuring device of claim 12, wherein a plurality of orifices is defined in each of the platforms between the hole and the heat pipe, for receiving the thermal probes therein.

14. The measuring device of claim 13, wherein the orifices are linearly arranged at uniform intervals.

* * * * *